United States Patent
Campbell et al.

(10) Patent No.: US 8,769,088 B2
(45) Date of Patent: Jul. 1, 2014

(54) MANAGING STABILITY OF A LINK COUPLING AN ADAPTER OF A COMPUTING SYSTEM TO A PORT OF A NETWORKING DEVICE FOR IN-BAND DATA COMMUNICATIONS

(75) Inventors: Keith M. Campbell, Cary, NC (US);
Patrick L. Caporale, Cary, NC (US);
Caroline M. Metry, Cary, NC (US);
Pravin S. Patel, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 35 days.

(21) Appl. No.: 13/249,940

(22) Filed: Sep. 30, 2011

(65) Prior Publication Data
US 2013/0086248 A1    Apr. 4, 2013

(51) Int. Cl.
*G06F 15/16*    (2006.01)
(52) U.S. Cl.
USPC .............................. 709/224; 726/22; 710/15
(58) Field of Classification Search
USPC ......................................................... 709/224
See application file for complete search history.

(56) References Cited

U.S. PATENT DOCUMENTS

| | | | |
|---|---|---|---|
| 6,470,397 | B1 | 10/2002 | Shah et al. |
| 7,031,345 | B1 | 4/2006 | Haber |
| 7,574,551 | B2 | 8/2009 | Gundam et al. |
| 2005/0108444 | A1* | 5/2005 | Flauaus et al. ............... 710/15 |
| 2009/0182916 | A1 | 7/2009 | Inagawa et al. |
| 2010/0124165 | A1* | 5/2010 | Yang et al. ................... 370/217 |
| 2011/0138463 | A1* | 6/2011 | Kim et al. ..................... 726/22 |
| 2012/0014247 | A1* | 1/2012 | Zhou et al. .................. 370/225 |
| 2012/0051216 | A1* | 3/2012 | Zhang et al. ................ 370/230 |
| 2012/0185582 | A1* | 7/2012 | Graessley .................... 709/224 |

FOREIGN PATENT DOCUMENTS

CN    101025707 A    8/2007

OTHER PUBLICATIONS

Nakano Et al, "ReViveI/O: Efficient Handling of I/O in Highly-Available Rollback-Recovery Servers", The 12th International Symposium on High-Performance Computer Architecture, Feb. 2006, pp. 200-211, IEEE Xplore, Champaign, IL.
Velureunni, "Fast Adapter-To-Adapter Failover on Offload Devices", Research Disclosure Database No. 525057; Published in the Jan. 2008 Paper Journal, pp. 1-3; The Book Barn, White Chimney Row, Westbourne, Hampshire, UK; Priority-Data: 2008RD-525057 (Jan. 10, 2008).

* cited by examiner

*Primary Examiner* — Hamza Algibhah
(74) *Attorney, Agent, or Firm* — Brandon C. Kennedy; Katherine S. Brown; Biggers Kennedy Lenart Spraggins LLP

(57) ABSTRACT

Managing stability of a link coupling an adapter of a computing system to a port of a networking device for in-band data communications, the adapter and the network device coupled for out-of-band data communications to a management module, where link stability is managed by: monitoring link health including retrieving adapter link statistics from the adapter and networking device link statistics from the networking device; determining, in dependence upon the adapter and networking device link statistics, whether the link health meets predefined health acceptability criteria; and if the link health does not meet predefined health acceptability criteria, instructing the adapter to execute one or more predefined corrective actions.

15 Claims, 4 Drawing Sheets

MANAGING STABILITY OF A LINK COUPLING AN ADAPTER OF A COMPUTING SYSTEM TO A PORT OF A NETWORKING DEVICE FOR IN-BAND DATA COMMUNICATIONS

BACKGROUND OF THE INVENTION

1. Field of the Invention

The field of the invention is data processing, or, more specifically, methods, apparatus, and products for managing stability of a link coupling an adapter of a computing system to a port of a networking device for in-band data communications.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

In data centers today that house many computers coupled to one another for data communications, link failure between those computers can negatively impact performance of the entire data center. Such networking errors today are only reported on networking devices, such as switches and routers, coupling the computers for data centers. Such reports are gathered and monitored by management software. When the management software identifies such a network error, the management software today either disables or restarts the port of the networking device reporting the networking error or fails over to another port or networking device. By relying solely on information from the perspective of the networking device, networking errors are often diagnosed incorrectly.

SUMMARY OF THE INVENTION

Methods, apparatus, and products for managing stability of a link coupling an adapter of a computing system to a port of a networking device for in-band data communications are disclosed. The adapter and the network device are coupled for out-of-band data communications to a management module. Managing link stability includes: monitoring, by the management module, link health including retrieving adapter link statistics from the adapter and networking device link statistics from the networking device; determining, in dependence upon the adapter link statistics and the networking device link statistics, whether the link health meets predefined health acceptability criteria; if the link health does not meet predefined health acceptability criteria, instructing, by the management module, the adapter to execute one or more predefined corrective actions; and responsive to the management module's instruction, executing, by the adapter, the one or more predefined corrective actions.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
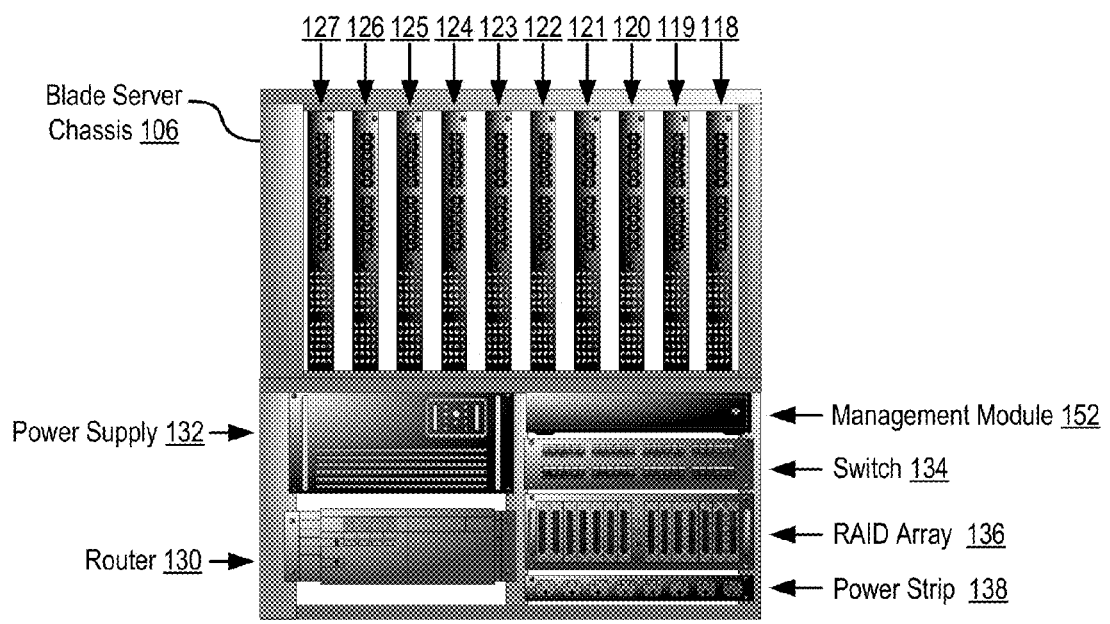
FIG. 1 sets forth a system for managing stability of a link coupling an adapter of a computing system to a port of a networking device for in-band data communications according to embodiments of the present invention.

Exemplary methods, apparatus, and products for managing stability of a link coupling an adapter of a computing system to a port of a networking device for in-band data communications in accordance with the present invention are described with reference to the accompanying drawings, beginning with FIG. 1. FIG. 1 sets forth a system for managing stability of a link coupling an adapter of a computing system to a port of a networking device for in-band data communications according to embodiments of the present invention. The system of FIG. 1 includes a multi-server chassis in the form of a blade server chassis (106). A blade server chassis is an enclosure in which blade servers as well as other electrical components are installed. The chassis provides cooling for servers, data communications networking connections, input/output device connections, power connections, and so on as will occur to those of skill in the art. One example blade server chassis is IBM's BladeCenter. An IBM BladeCenter E includes 14 blade slots, a shared media tray with an optical drive, floppy drive, and Universal Serial Bus (USW) port, one or more management modules, two or more power supplies, two redundant high speed blowers, two slots for Gigabit Ethernet switches, and two slots for optional switch or pass-through modules such as Ethernet, Fibre Channel, InfiniBand or Myrient 2000 modules.

The example blade server chassis (106) of Figure includes ten blade servers (118-127). A server, as the term is used in this specification, refers generally to a multi-user computer that provides a service (e.g. database access, file transfer, remote access) or resources (e.g. file space) over a network connection. The term 'server,' as context requires, refers inclusively to the server's computer hardware as well as any server application software or operating system software running on the server. A server application is an application program that accepts connections in order to service requests from users by sending back responses. A server application can run on the same computer as the client application using it, or a server application can accept connections through a computer network. Examples of server applications include file server, database server, backup server, print server, mail server, web server, FTP servers, application servers, VPN servers, DHCP servers, DNS servers, WINS servers, logon servers, security servers, domain controllers, backup domain controllers, proxy servers, firewalls, and so on.

Blade servers are self-contained servers, designed for high density. As a practical matter, all computers are implemented with electrical components requiring power that produces heat. Components such as processors, memory, hard drives, power supplies, storage and network connections, keyboards, video components, a mouse, and so on, merely support the basic computing function, yet they all add bulk, heat, complexity, and moving parts that are more prone to failure than solid-state components. In the blade paradigm, most of these functions are removed from the blade computer, being either provided by the blade server chassis (DC power) virtualized (iSCSI storage, remote console over IP), or discarded entirely (serial ports). The blade itself becomes simpler, smaller, and amenable to dense installation with many blade servers in a single blade server chassis.

In addition to the blade servers (109-127), the blade server chassis (104, 106) in the example of FIG. 1 also house several other electrical components including a power supply (132), a data communications router (130), a switch (134) a RAID array (136), a power strip (138) and a management module (152).

A management module is an aggregation of computer hardware and software that is installed in a server chassis to provide support services for computing devices, such as blade servers. Support services provided by the management module (152) include monitoring health of computing devices and reporting health statistics to a system management server, power management and power control, save and restore configurations, discovery of available computing devices, event log management, memory management, and so on. An example of a management module that can be adapted for use in systems that manage stability of a link coupling an adapter of a computing system to a port of a networking device for in-band data communications in accordance with the present invention IBM's Advanced Management Module ('AMM').

The management module (152) is connected for in-band data communications to the blade servers and other computing devices through a local area network ('LAN') implemented in part by the switch (134). Such a LAN may be implemented as an Ethernet network, an IP (Internet Protocol) network, or the like. The management module is also connected to the blade servers and to the switch (134) through out-of-band data communications link. Such an out-of-band communications link may be implemented as an Inter-Integrated Circuit ('I²C') bus, a System Management Bus ('SMBus'), an Intelligent Platform Management Bus ('IPMB'), an RS-485 bus, or the like.

Each blade server is coupled through an adapter and a link to the switch (134) for primary, in-band data communications. From time to time and for various reasons, the link may fail or operate under sub-par standards. The cause of such link failure may reside in the switch (134), in the adapter of the blade server, or in the physical link itself. The management module (134) in the example of FIG. 1 is configured to manage stability of such a link in accordance with the present invention by: monitoring link health including retrieving adapter link statistics from the adapter and networking device link statistics from the networking device—switch (134); and determining, in dependence upon the adapter link statistics and the networking device link statistics, whether the link health meets predefined health acceptability criteria; and if the link health does not meet predefined health acceptability criteria, instructing the adapter to execute one or more predefined corrective actions. Responsive to the management module's instruction, the adapter of the blade server executes the one or more predefined corrective actions. In the example of FIG. 1, retrieving the adapter and networking device link statistics and instructing the adapter to take corrective action may be effected through use of the out-of-band data communications links amongst the management module, switch (134), and blade server adapters. In this way, the management module monitors link health based on the perspective of the switch as well as the adapter of the blade server.

The arrangement of servers, chassis, routers, power supplies, management modules, and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Managing stability of a link coupling an adapter of a computing system to a port of a networking device for in-band data communications in accordance with embodiments of the present invention is generally implemented with computers, that is, with automated computing machinery. In the system of FIG. 1, for example, the blade servers (118-127), management module (152, and switch (134) are implemented to some extent at least as computers. For further explanation, therefore, FIG. 2 sets forth a block diagram of automated computing machinery comprising an exemplary computer (152a) and management module (152b) useful in managing stability of a link coupling an adapter of a computing system to a port of a networking device for in-band data communications according to embodiments of the present invention. The computer (152a) of FIG. 2 includes at least one computer processor (156) or 'CPU' as well as random access memory (168) ('RAM') which is connected through a high speed memory bus (166) and bus adapter (158) to processor (156) and to other components of the computer (152).

Stored in RAM (168) of the computer (152a) is an application (128), a module of computer program instructions that, when executed, carries out user-level data processing tasks. Examples of such applications (128) may include data base management applications, multimedia library applications, messaging applications, word processing applications, database applications, spreadsheet applications, server applications, and so on as will occur to readers of skill in the art. Also stored in RAM (168) is an operating system (154). Operating systems useful managing stability of a link coupling an adapter of a computing system to a port of a networking device for in-band data communications according to embodiments of the present invention include UNIX™ Linux™ Microsoft XP™ AIX™ IBM's i5/OS™ and others as will occur to those of skill in the art. The operating system (154) and application (128) in the example of FIG. 2 are shown in RAM (168), but many components of such software typically are stored in non-volatile memory also, such as, for example, on a disk drive (170).

Figure 2:
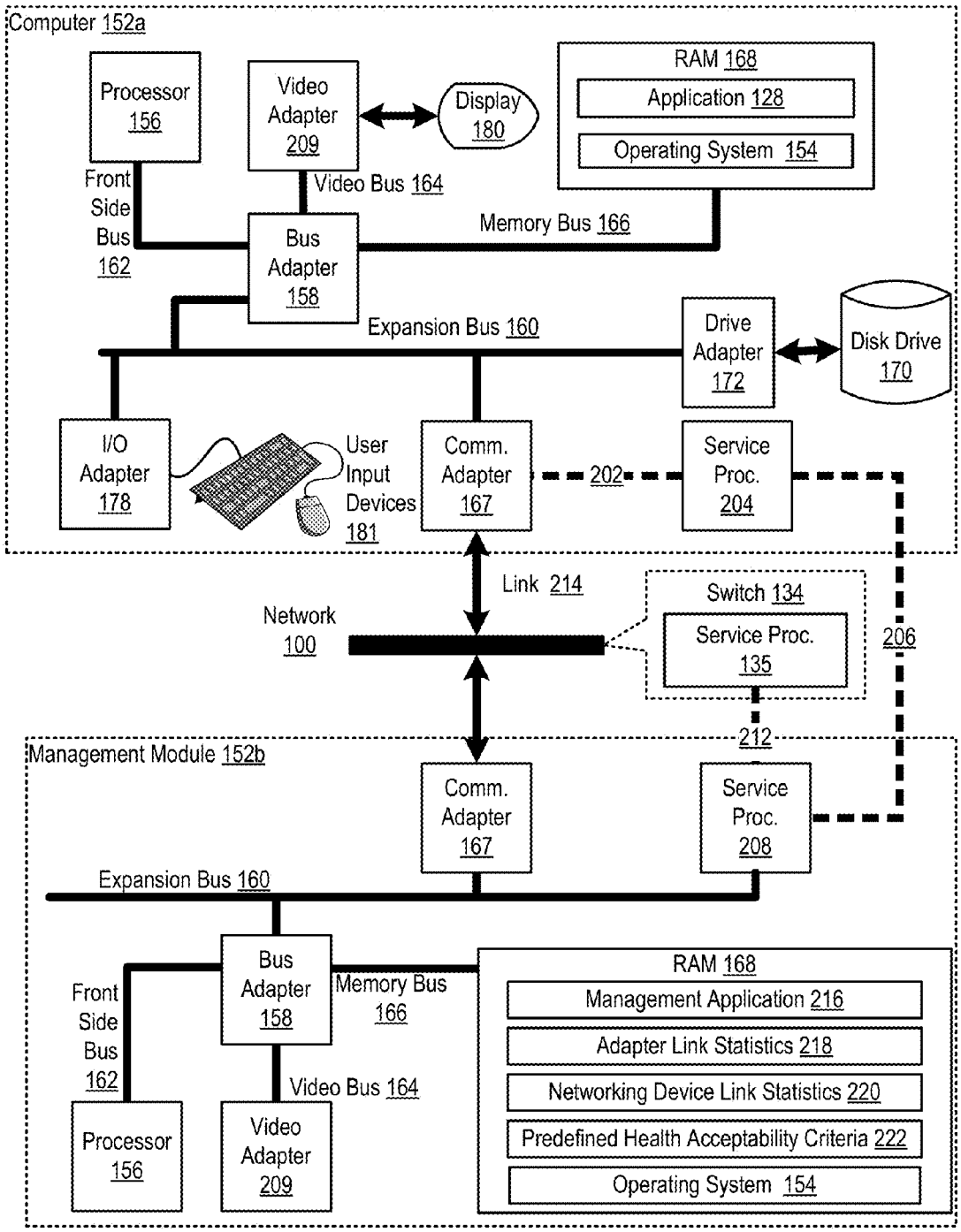
FIG. 2 sets forth a block diagram of automated computing machinery comprising an exemplary computer and management module useful in managing stability of a link coupling an adapter of a computing system to a port of a networking device for in-band data communications according to embodiments of the present invention.

The computer (152a) of FIG. 2 includes disk drive adapter (172) coupled through expansion bus (160) and bus adapter (158) to processor (156) and other components of the computer (152a). Disk drive adapter (172) connects non-volatile data storage to the computer (152a) in the form of disk drive (170). Disk drive adapters useful in computers for managing stability of a link coupling an adapter of a computing system to a port of a networking device for in-band data communications according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152a) of FIG. 2 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152a) of FIG. 2 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computer (152a) of FIG. 2 includes a communications adapter (167) for data communications with other computers, the management module, and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful for managing stability of a link coupling an adapter of a computing system to a port of a networking device for in-band data communications according to embodiments of the present invention include modems for wired dial-up communications, Ethernet (IEEE 802.3) adapters for wired data communications network communications, and 802.11 adapters for wireless data communications network communications.

The example computer is coupled through data communications adapter to the network (100) by way of a switch (134). That is, the example network (100) of FIG. 2 is implemented, at least in part, by a switch (134)—an example networking device. The communications adapter (167) is coupled to the switch (134) through a link (214).

The communications adapter (167) of the computer in the example of FIG. 2 is also coupled to a service processor (204) through an out-of-band link (202) for out-of-band data communications. The service processor (204) is also coupled to a service processor (208) of the management module (152b) through an out-of-band link (206) for out-of-band data communications. The management module's (152b) service processor (208) is coupled through another out-of-band link (212) to a service processor (135) of the switch (134).

The management module (152b) is another example computer which includes many of the same components as the computer (152a). The management module (152b), for example, includes RAM (168). Stored in RAM (168) of the management module (152b) is a management application (216). The management application (216) is a module of computer program instructions that, when executed, causes the management module to operate for managing stability of a link coupling an adapter of a computing system to a port of a networking device for in-band data communications in accordance with embodiments of the present invention. In managing link stability—specifically, the link (214) coupling the computer (152a) to the switch (134) for primary, in-band data communications—the management module (152b) monitors link health including retrieving adapter link statistics (218) from the adapter (167) and networking device link statistics (220) from the networking device (134); determining, in dependence upon the adapter link statistics (218) and the networking device link statistics (220), whether the link health meets predefined health acceptability criteria (222); and if the link health does not meet predefined health acceptability criteria, instructing the adapter (167) to execute one or more predefined corrective actions. Responsive to the management module's (152b) instruction, the adapter (167) executes the one or more predefined corrective actions.

Figure 3:
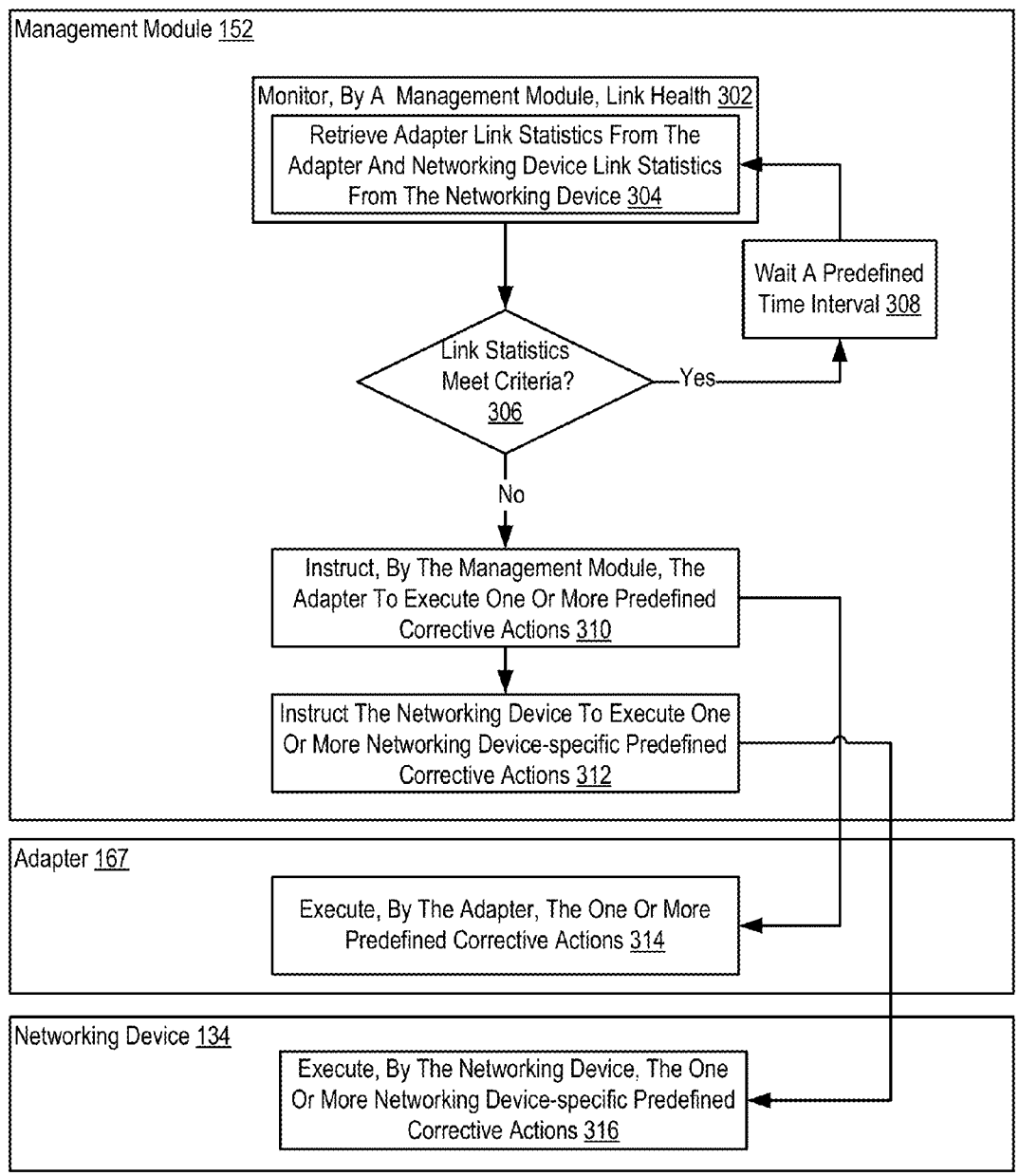
FIG. 3 sets forth a flow chart illustrating an exemplary method for managing stability of a link coupling an adapter of a computing system to a port of a networking device for in-band data communications according to embodiments of the present invention.

For further explanation, FIG. 3 sets forth a flow chart illustrating an exemplary method for managing stability of a link coupling an adapter of a computing system to a port of a networking device for in-band data communications according to embodiments of the present invention. In the method of FIG. 3, the adapter and the network device are coupled for out-of-band data communications to a management module, The method of FIG. 3 includes monitoring (302), by the management module (152), link health. Monitoring link health includes retrieving (304) adapter link statistics from the adapter and networking device link statistics from the networking device. Such a retrieval may be carried out through an out-of-band data communications link between the management module and the adapter and the networking device.

The method of FIG. 3 also includes determining (306), in dependence upon the adapter link statistics and the networking device link statistics, whether the link health meets predefined health acceptability criteria. If the link health does meet predefined health acceptability criteria, the method of FIG. 3 continues by waiting a predefined time interval (308) before again retrieving (3040 the adapter and networking device link statistics. That is, until a networking error or failure is detected, the management module may periodically poll the link health.

If the link health does not meet the predefined health acceptability criteria, the method of FIG. 3 includes instructing (310), by the management module, the adapter to execute one or more predefined corrective actions. The management module may send such an instruction to the adapter through out-of-band links and a service processor. In some embodiments, the management module may also instruct (312) the networking device to execute one or more networking device-specific predefined corrective actions. That is, the management module may cause both the adapter and the networking device to take the same or different corrective action to regain link health.

Responsive to the management module's instruction, the method of FIG. 3 continues by executing (314), by the adapter, the one or more predefined corrective actions and executing (316), by the networking device, the one or more networking device-specific predefined corrective actions. Corrective actions, whether actions carried out by the network device or the adapter, may include any combination of renegotiation of Serializer/Deserializer ('SERDES') values, throttling link speed, and re-initializing the link.

Figure 4:
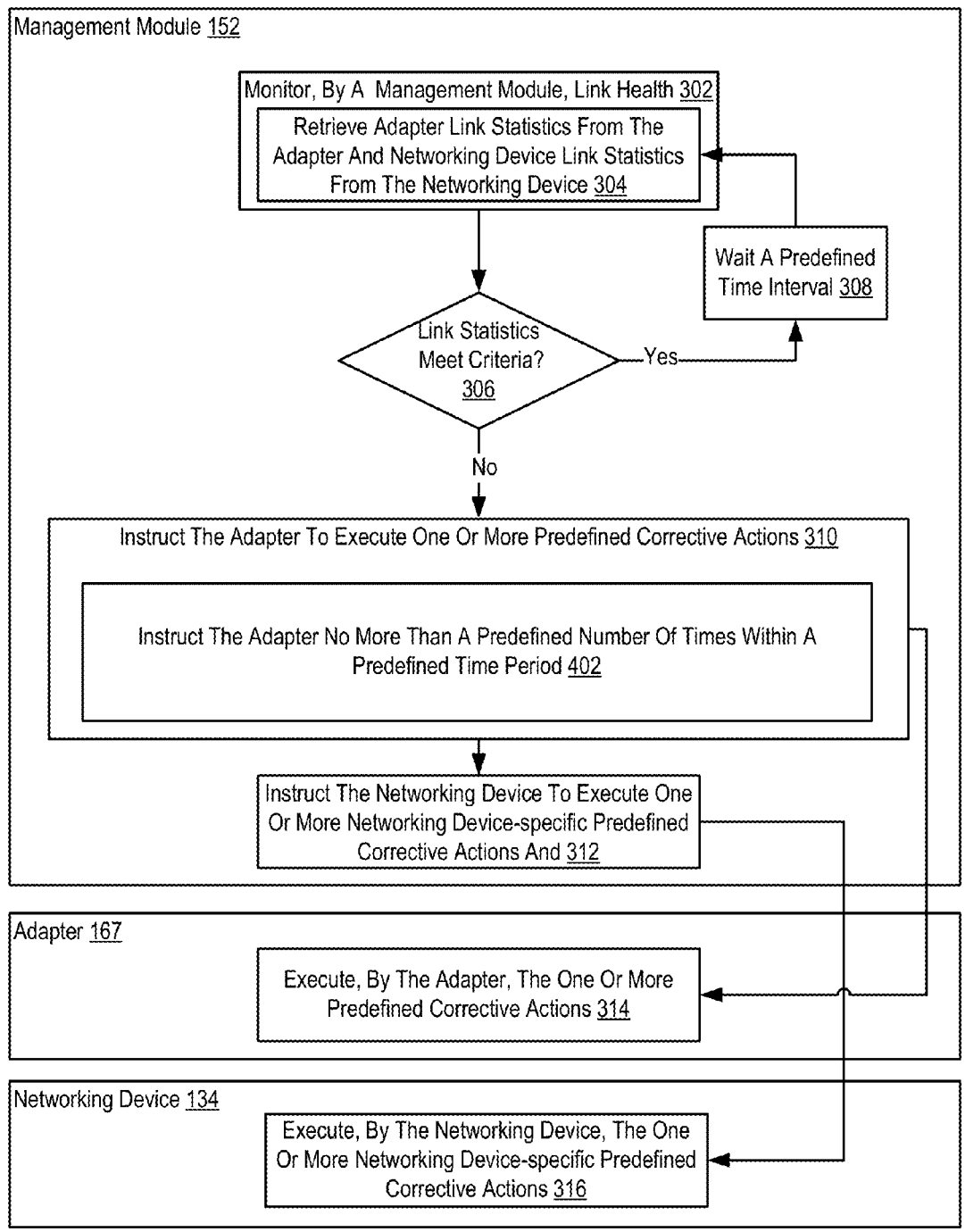
FIG. 4 sets forth a flow chart illustrating a further exemplary method for managing stability of a link coupling an adapter of a computing system to a port of a networking device for in-band data communications according to embodiments of the present invention.

For further explanation, FIG. 4 sets forth a flow chart illustrating a further exemplary method for managing stability of a link coupling an adapter of a computing system to a port of a networking device for in-band data communications according to embodiments of the present invention. The method of FIG. 4 is similar to the method of FIG. 3 including as it does: monitoring (302) link health; determining (306) whether the link health meets predefined health acceptability criteria; instructing (310) the adapter to execute one or more predefined corrective actions and instructing the networking device to execute networking device-specific predefined corrective actions if the link statistics do not meet the acceptability criteria; executing (314, 316) the predefined corrective actions.

The method of FIG. 4 differs from the method of FIG. 3 however in that in the method of FIG. 4, instructing (310) the adapter to execute one or more predefined corrective actions is includes instructing (402) the adapter no more than a predefined number of times within a predefined time period. That is, the management module (152) may be configured to attempt corrective action only a predefined number of times over a period of time. After the time period ends, the management module may notify a system administrator that corrective action has failed.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of managing stability of a link for in-band data communications, the method comprising:
    monitoring, by the management module, link health of a link coupling an adapter of a computing system to a port of a networking device, including retrieving adapter link statistics from the adapter, and retrieving networking device link statistics from the networking device,
    wherein the adapter and the networking device are each coupled for out-of-band data communications to the management module;
    determining, in dependence upon the adapter link statistics and the networking device link statistics, whether the link health meets predefined health acceptability criteria;
    if the link health does not meet predefined health acceptability criteria:
        instructing, by the management module via a first out-of-band link, the adapter to execute one or more predefined corrective actions,
            wherein the first out-of-band link couples the management module to the adapter for out-of-band data communications, and
            wherein the adapter executes the one or more predefined corrective actions responsive to the management module's instruction; and
        instructing, by the management module via a second out-of-band link, the networking device to execute one or more networking device-specific predefined corrective actions,
            wherein the second out-of-band link couples the management module to the networking device for out-of-band data communications, and
            wherein the networking device executes the one or more networking device-specific predefined corrective actions, and
    wherein upon execution of the predefined corrective actions and execution of the network device-specific predefined corrective actions, the link health of the link for in-band communications meets the predefined health acceptability criteria.

2. The method of claim 1 wherein the one or more predefined corrective actions includes one of:
    renegotiation of Serializer/Deserializer ('SERDES') values;
    throttling link speed; and
    re-initializing the link.

3. The method of claim 1 wherein instructing the adapter to execute one or more predefined corrective actions further comprises instructing the adapter no more than a predefined number of times within a predefined time period.

4. The method of claim 1 wherein monitoring link health further comprises periodically at a predefined time interval: retrieving the adapter link statistics from the adapter and networking device link statistics from the networking device.

5. The method of claim 1 wherein the computing system comprising a server installed in a multi-server chassis, the management module comprises a chassis management module, the networking device comprises a switch coupling a plurality of servers and computing devices within the chassis for in-band data communications, and out-of-band data communications between the chassis management module and the adapter is carried out through an out-of-band data communications link between the chassis management module and a server management module, the server management module coupled to the adapter through another out-of-band data communications link.

6. An apparatus for managing stability of a link for in-band data communications, the apparatus comprising a computer processor, a computer memory operatively coupled to the computer processor, the computer memory having disposed within it computer program instructions capable of:
    monitoring, by the management module, link health of a link coupling an adapter of a computing system to a port of a networking device, including retrieving adapter link statistics from the adapter, and retrieving networking device link statistics from the networking device,
    wherein the adapter and the networking device are each coupled for out-of-band data communications to the management module;
    determining, in dependence upon the adapter link statistics and the networking device link statistics, whether the link health meets predefined health acceptability criteria;
    if the link health does not meet predefined health acceptability criteria:
        instructing, by the management module via a first out-of-band link, the adapter to execute one or more predefined corrective actions,
            wherein the first out-of-band link couples the management module to the adapter for out-of-band data communications, and
            wherein the adapter executes the one or more predefined corrective actions responsive to the management module's instruction; and
        instructing, by the management module via a second out-of-band link, the networking device to execute one or more networking device-specific predefined corrective actions,
            wherein the second out-of-band link couples the management module to the networking device for out-of-band data communications, and
            wherein, the networking device executes the one or more networking device-specific predefined corrective actions, and
    wherein upon execution of the predefined corrective actions and execution of the network device-specific predefined corrective actions, the link health of the link for in-band communications meets the predefined health acceptability criteria.

7. The apparatus of claim 6 wherein the one or more predefined corrective actions includes one of:
    renegotiation of Serializer/Deserializer ('SERDES') values;
    throttling link speed; and
    re-initializing the link.

8. The apparatus of claim 6 wherein instructing the adapter to execute one or more predefined corrective actions further comprises instructing the adapter no more than a predefined number of times within a predefined time period.

9. The apparatus of claim 6 wherein monitoring link health further comprises periodically at a predefined time interval: retrieving the adapter link statistics from the adapter and networking device link statistics from the networking device.

10. The apparatus of claim 6 wherein the computing system comprising a server installed in a multi-server chassis, the management module comprises a chassis management module, the networking device comprises a switch coupling a plurality of servers and computing devices within the chassis for in-band data communications, and out-of-band data communications between the chassis management module and the adapter is carried out through an out-of-band data communications link between the chassis management module and a server management module, the server management module coupled to the adapter through another out-of-band data communications link.

11. A computer program product managing stability of a link for in-band data communications, the computer program product disposed upon a computer readable medium, wherein the computer readable medium is not a signal, the computer program product comprising computer program instructions capable, when executed, of causing a computer to carry out the steps of:

monitoring, by the management module, link health of a link coupling an adapter of a computing system to a port of a networking device, including retrieving adapter link statistics from the adapter, and retrieving networking device link statistics from the networking device, wherein the adapter and the networking device are each coupled for out-of-band data communications to the management module;

determining, in dependence upon the adapter link statistics and the networking device link statistics, whether the link health meets predefined health acceptability criteria;

if the link health does not meet predefined health acceptability criteria:

instructing, by the management module via a first out-of-band link, the adapter to execute one or more predefined corrective actions, wherein the first out-of-band link couples the management module to the adapter for out-of-band data communications, and wherein the adapter executes the one or more predefined corrective actions responsive to the management module's instruction; and instructing, by the management module via a second out-of-band link, the networking device to execute one or more networking device-specific predefined corrective actions, wherein the second out-of-band link couples the management module to the networking device for out-of-band data communications, and wherein the networking device executes the one or more networking device-specific predefined corrective actions, and wherein upon execution of the predefined corrective actions and execution of the network device-specific predefined corrective actions, the link health of the link for in-band communications meets the predefined health acceptability criteria.

12. The computer program product of claim 11 wherein the one or more predefined corrective actions includes one of:

renegotiation of Serializer/Deserializer ('SERDES') values;

throttling link speed; and re-initializing the link.

13. The computer program product of claim 11 wherein instructing the adapter to execute one or more predefined corrective actions further comprises instructing the adapter no more than a predefined number of times within a predefined time period.

14. The computer program product of claim 11 wherein monitoring link health further comprises periodically at a predefined time interval: retrieving the adapter link statistics from the adapter and networking device link statistics from the networking device.

15. The computer program product of claim 11 wherein the computing system comprising a server installed in a multi-server chassis, the management module comprises a chassis management module, the networking device comprises a switch coupling a plurality of servers and computing devices within the chassis for in-band data communications, and out-of-band data communications between the chassis management module and the adapter is carried out through an out-of-band data communications link between the chassis management module and a server management module, the server management module coupled to the adapter through another out-of-band data communications link.

\* \* \* \* \*